United States Patent
Kaldor et al.

(10) Patent No.: US 9,970,463 B2
(45) Date of Patent: May 15, 2018

(54) UTILITY VEHICLE TWO SPEED DRIVE MOTOR CONTROL

(71) Applicants: Clark Equipment Company, West Fargo, ND (US); Polaris Industries Inc., Medina, MN (US)

(72) Inventors: Matthew J. Kaldor, Bismarck, ND (US); Marcus A. Wetterlund, Forest Lake, MN (US)

(73) Assignee: Clark Equipment Company, West Fargo, ND (US)

( * ) Notice: Subject to any disclaimer, the term of this patent is extended or adjusted under 35 U.S.C. 154(b) by 0 days. days.

(21) Appl. No.: 13/728,149

(22) Filed: Dec. 27, 2012

(65) Prior Publication Data

US 2014/0060248 A1 Mar. 6, 2014

Related U.S. Application Data (60) Provisional application No. 61/696,530, filed on Sep. 4, 2012.

(51) Int. Cl.
*F15B 9/03* (2006.01)
*F16H 61/433* (2010.01)
(Continued)

(52) U.S. Cl.
CPC ............ *F15B 9/03* (2013.01); *F16H 61/421* (2013.01); *F16H 61/433* (2013.01);
(Continued)

(58) Field of Classification Search
None
See application file for complete search history.

(56) References Cited

U.S. PATENT DOCUMENTS 2,817,250 A 12/1957 Forster
2,838,908 A 6/1958 Forster
(Continued)

FOREIGN PATENT DOCUMENTS

CN 101545274 A 9/2009
CN 101878145 A 11/2010
(Continued)

OTHER PUBLICATIONS

Invitation to Pay Additional Fees dated Jul. 23, 2013 for International Application No. PCT/US2012/071771 filed Dec. 27, 2012, 5 pages.
(Continued)

*Primary Examiner* — Ramya P Burgess
*Assistant Examiner* — Timothy Hannon
(74) *Attorney, Agent, or Firm* — John D. Veldhuis-Kroeze; Westman, Champlin & Koehler, P.A.

(57) ABSTRACT

Disclosed are power machines, and drive systems for use thereon, as well as methods of controlling the displacement of a hydraulic drive motor. The drive system includes a drive pump capable of providing a hydraulic power output and a drive motor operably coupled to the drive pump that receives the hydraulic power output from the drive pump. The drive motor has an operating displacement that is variable between a minimum displacement and a maximum displacement and it provides a rotational output member. A shift actuator is operably coupled to the drive motor and it is configured to vary the displacement of the drive motor between the minimum displacement and the maximum displacement. A controller controls the shift actuator to cause the drive motor to provide infinitely variable displacement between the minimum and maximum displacements.

11 Claims, 6 Drawing Sheets

(51) Int. Cl.
*F16H 59/68* (2006.01)
*F16H 61/421* (2010.01)
*F16H 59/44* (2006.01)

(52) U.S. Cl.
CPC .......... *B60W 2510/104* (2013.01); *B60W 2510/1005* (2013.01); *B60W 2520/10* (2013.01); *F16H 59/44* (2013.01); *F16H 2059/6807* (2013.01); *F16H 2200/0017* (2013.01); *Y10T 74/19158* (2015.01)

(56) References Cited

U.S. PATENT DOCUMENTS

| | | |
|---|---|---|
| 2,874,533 A | 2/1959 | Schott |
| 3,199,378 A | 8/1965 | Badalini |
| 3,375,756 A | 4/1968 | Bienaime |
| 4,215,545 A | 8/1980 | Morello et al. |
| 4,254,672 A | 3/1981 | Mizuno et al. |
| 4,286,477 A | 9/1981 | Meyerle et al. |
| 4,402,181 A | 9/1983 | Acker et al. |
| 4,434,616 A | 3/1984 | Christopher et al. |
| 4,621,495 A | 11/1986 | Hedlund |
| 4,766,779 A | 8/1988 | Massy |
| 5,177,964 A | 1/1993 | Tanaka et al. |
| 6,558,072 B2 | 5/2003 | Staffenhagen et al. |
| 6,604,601 B2 | 8/2003 | Steele |
| 2004/0177610 A1 | 9/2004 | Hendrickson |
| 2009/0238696 A1 | 9/2009 | Satake et al. |
| 2009/0248259 A1 | 10/2009 | Lee |
| 2010/0095663 A1 | 4/2010 | Hyodo et al. |

FOREIGN PATENT DOCUMENTS

| | | |
|---|---|---|
| CN | 102483157 A | 5/2012 |
| DE | 102004023629 | 12/2005 |
| JP | 6317245 | 11/1994 |

OTHER PUBLICATIONS

Search Report and Written Opinion dated Sep. 18, 2013 for International Application No. PCT/US2012/071771 filed Dec. 27, 2012, 12 pages.
Chinese Office Action and English Translation dated Mar. 10, 2016 for Chinese Application No. 201280074417.1.
Chinese Office Action and English translation dated Jan. 9, 2017 for Chinese Application No. 201280074417.1, 17 pages.
Communication from the European Patent Office dated Aug. 10, 2016 for European Application No. 12818865.3, 4 pages.
European Office Action dated Aug. 4, 2017 for European Application No. 12818865.3, 5 pages.

UTILITY VEHICLE TWO SPEED DRIVE MOTOR CONTROL

CROSS-REFERENCE TO RELATED APPLICATION

This application claims the benefit of U.S. Provisional Patent Application 61/696,530 filed on Sep. 4, 2012, the contents of which are incorporated by reference into this application in their entirety.

BACKGROUND

Various power machines such as utility vehicles have two-speed axial piston drive motors that provide different displacements in the two different speeds. In one speed, a larger displacement is provided, resulting in a higher torque output, but a lower travel speed. In another speed, a lower displacement is provided, resulting in a higher travel speed, but with a lower torque output. Shifting a hydraulic drive motor from one speed to another while driving can cause a jolt to an operator. The discussion above is merely provided for general background information and is not intended to be used as an aid in determining the scope of the claimed subject matter.

SUMMARY

Disclosed are power machines, and drive systems for use thereon, as well as methods of providing smooth shifting of a two-speed drive motor.

In one embodiment, a disclosed power machine has an engine and a drive system configured to effect travel of a power machine. The drive system includes a drive pump driven by the engine and a drive motor operably coupled to the drive pump. The drive pump is capable of providing a hydraulic power output to the drive motor and the drive motor has a rotational output member. The drive motor has an operating displacement that is variable between a minimum displacement and a maximum displacement. A shift actuator is configured to vary the displacement of the drive motor between the minimum displacement and the maximum displacement. A controller controls the shift actuator to cause the drive motor to provide infinitely variable displacement between the minimum and maximum displacements. In some cases, a gearbox selectively operably couples the rotational output member of the drive motor to one of a plurality of gear reduction sets and a gear sensor provides the controller with an indication of which of the plurality of gear reduction sets is selected. The controller controls the shift actuator based upon which of the plurality of gear reductions sets is selected.

In another embodiment, a disclosed power machine has an engine, a drive pump driven by the engine to provide a hydraulic power output, and a drive motor configured to receive the hydraulic power output from the drive pump and in response to rotate a rotational output member. The drive motor selectively operates in a low range mode having high-displacement and in a high range mode having low-displacement. A travel speed sensor provides a signal indicative of the travel speed of the power machine. A shift actuator controls the displacement of the drive motor. A controller controls the shift actuator to cause the drive motor to provide substantially continuously variable displacement between the high-displacement of the low range mode and the low-displacement of the high range mode. The displacement of the drive motor is varied as a function of the travel speed of the machine.

In still another embodiment, a disclosed method controls a displacement of a drive motor. The method includes measuring a travel speed of the power machine and providing a control signal as a function of the measured travel speed to vary the motor between a maximum displacement and a minimum displacement.

This Summary is provided to introduce a selection of concepts in a simplified form that are further described below in the Detailed Description.

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The phraseology and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
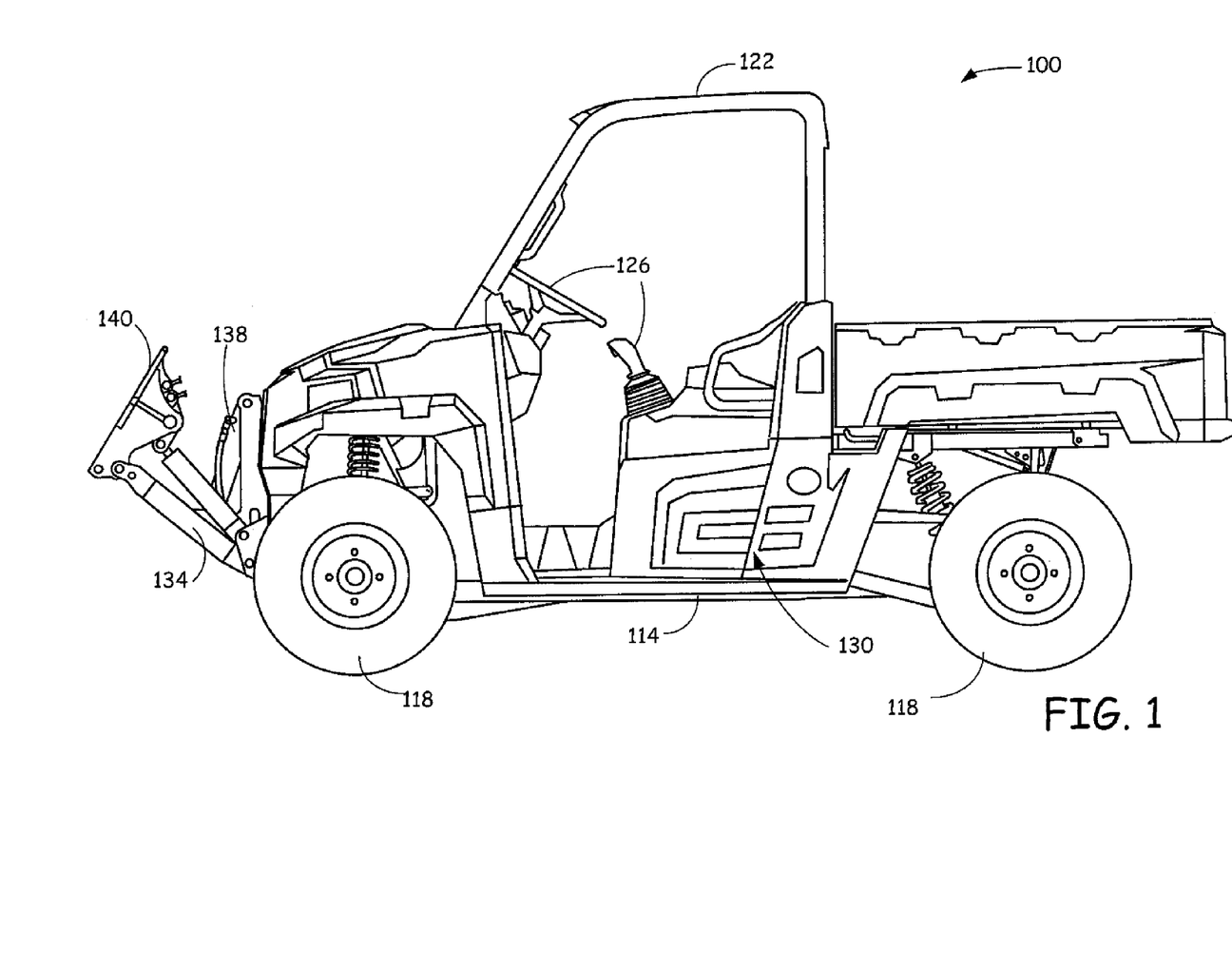
FIG. 1 is a left side view of a utility vehicle or power machine configured to implement two-speed drive motor control according to a disclosed embodiment.

A power machine or vehicle 100 in the form of a utility vehicle is shown in FIG. 1 and is provided as one example of a type of power machine in which disclosed embodiments can be utilized. Other types of power machines on which the disclosed embodiments can be practiced include various types of loaders, excavators, telehandlers, and the like. Power machine 100 includes a frame 114 supported for movement over the ground by front and rear pairs of tractive elements 118, which are illustratively shown in FIG. 1 as wheels, but can be other types of tractive elements such as powered tracks. An operator cab 122 that defines, at least in part, an operator compartment for carrying an operator, is mounted to the frame 114 and includes operator controls 126 for controlling operation of the power machine 100. Operator controls 126 can include any of a variety of different operator control device types such as a steering wheel, foot pedals, joysticks, buttons, sliders, switches, touch sensitive display screens, rotatable devices that are incorporated into operator levers, handles, instrument panels, to name a few examples, and the illustrated operator controls 126 generally represent the various operator control types.

An engine, represented generally at reference number 130, is mounted to the frame 114 and provides a power source for moving the wheels 118 and also for other systems. Additionally, the engine 130 provides a power source to various power machine components. In some embodiments, the engine 130 is an internal combustion engine. Alternatively, the engine can be a hydraulic engine, an electric generator, or other types of engines, or in some cases, the engine can be a collection of one or more power sources, such as an internal combustion engine and an electric generator, such as can be found in so-called hybrid vehicles.

The power machine 100 also includes a lift arm 134 mounted to the frame 114, although in other embodiments various different types of arms can be used. Also, in some cases, a power machine may not have a lift arm or other type of arm. An implement carrier 140 capable of carrying an implement (not shown) is pivotally coupled to a distal end of the lift arm 134. The implement can be any of a wide variety of implements including, as some examples, buckets, push blades, mowers, pallet forks, and push brooms to name just a few. One or more actuators 138 are pivotally coupled between the frame 114 and the lift arm 134 for raising and lowering the lift arm 134 in response to manipulation of operator controls 126 by an operator to control the position of the lift arm. In some embodiments, hydraulic cylinders are used as lift arm actuators, although other types of actuators can be employed. One or more other actuators 142 can also be included for performing various operator controlled functions such as rotating or tilting an implement with respect to the lift arm 134. Such actuators are generally pivotally attached to each of the frame 114 or a member that is rigidly attached to the frame or the lift arm 134 and the implement carrier 140 or, in the case of various embodiments that do not have an implement carrier, to the implement itself. Other user controlled functions can be performed as well, such as control of various functions on some implements. Power machine 100 also illustratively includes an operator controlled hydraulic drive system such as the one illustrated in example embodiments shown in FIGS. 2 and 3.

Figure 2:
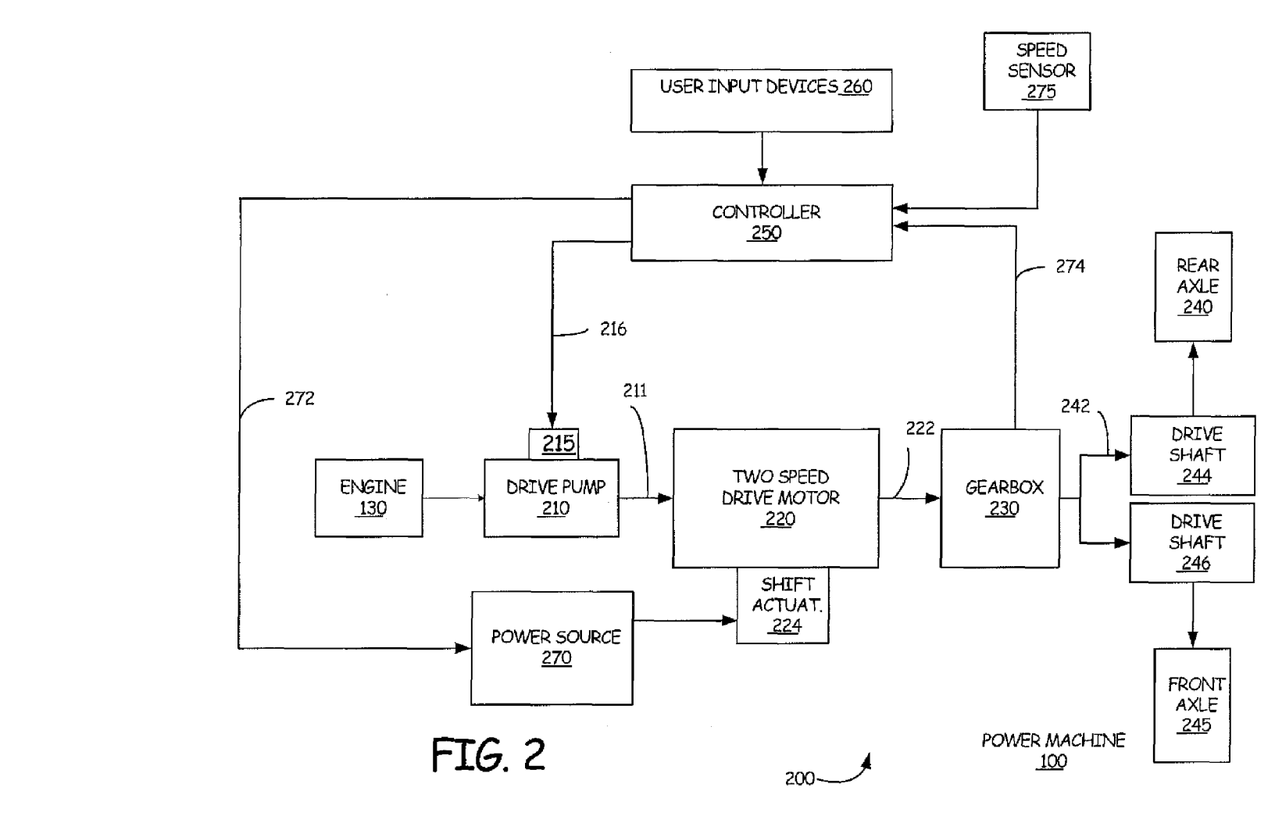
FIG. 2 is a block diagram illustrating a drive system, of exemplary disclosed power machine embodiments, providing two-speed drive motor control.

FIG. 2 illustrates a block diagram of a drive system 200 of power machine 100 used in effecting machine travel. As shown, engine 130 powers a drive pump 210 capable of providing a hydraulic power output 211 in the form of hydraulic fluid under pressure. Drive pump 210 is, in the illustrative embodiment, a variable displacement pump capable of providing to and receiving pressurized hydraulic fluid from an actuation device such as a drive motor 220 shown in FIG. 2. Under the control of a signal 216 from machine controller 250, or under other electrical or mechanical control, an actuator 215 controls both the direction and amount of hydraulic flow provided by the drive pump 210 to the drive motor 220, which in turn causes the drive motor 220 to rotate in one of a first direction corresponding to forward movement of the power machine 100 and a second direction, corresponding to reverse movement of the power machine 100. A speed sensor 275 is in communication with controller 250 to provide an indication of the travel speed of power machine 100. In exemplary embodiments, the drive motor 220 is a two-speed axial piston drive motor configured to operate in a high-displacement, low speed (low-range) mode and a low-displacement, high speed (high-range) mode, with the modes being controllable by a shift actuator 224. In some embodiments, shift actuator 224 is a hydraulic cylinder, although it can be any suitable actuator, operably coupled to a swash plate of drive motor 220 to influence the angle of the swash plate and thereby change the displacement of the drive motor. When the drive motor is in the low-range mode, the drive motor has a maximum displacement and when the drive motor is in the high-range mode, the drive motor has a minimum displacement. When the drive motor 220 is being shifted from the low-range mode to the high-range mode, it can be said to be moving away from a maximum displacement position and toward a minimum displacement position. Conversely, when the drive motor 220 is being shifted from the high-range mode to the low-range mode, it can be said to be moving away from the minimum displacement position and toward the maximum displacement position.

The drive motor 220 provides a rotational output member 222 that is provided as an input to a mechanical gearbox 230. Gearbox 230 is in exemplary embodiments a two-speed gearbox. However, gearbox 230 can be a multi-speed gearbox having more than two speed positions or a single speed gearbox. In an example embodiment, the mechanical gearbox 230 is integrated into a rear differential on a rear axle 240 and coupled to a drive shaft provided to a front axle 245, but a number of different embodiments can be employed. For example, a gearbox output 242 can be coupled to a pair of drive shafts 244 and 246, each of which is provided to drive front and rear axles. In other embodiments, the gearbox can drive one of the axles directly with the other axle being driven through a drive shaft coupled to an output of the gearbox. Each of the axles 240 and 245 are configured to drive a pair of wheels 118 as shown in FIG. 1. It should also be appreciated that various configurations can be adapted to convert a drive output from the gearbox 230 to the wheels 118 and that this example is but one possible arrangement.

Drive system 200 is an electrically controlled drive system in which controller 250 is responsive to one or more user input devices 260, drives pump displacement and direction via signal line(s) 216, drive motor operation, and gearbox operation via signal line(s) 274. In some embodiments, signal lines 274 provide an indication such as from a position sensor in the gearbox to the controller indicating which gear is engaged in the gearbox. The gearbox can be mechanically shifted or controlled by the controller 250 via signal lines 274. Control of two-speed drive motor 220 is described in more detail below. While a single machine controller 250 is illustrated, those of skill in the art will recognize that in alternate embodiments separate controllers can be used to control different components of the drive system and further that in some embodiments a controller that controls drive system functions can also perform other functions related to the power machine 100.

Drive systems such as drive system 200 commonly provide two-speed drive motors to accommodate various operating conditions. In some instances, it is advantageous to provide a high torque drive output at the expense of high-end travel speed. In other instances, it is advantageous to provide a high-speed output at the expense of some torque. This goal is commonly accomplished by employing a two-speed drive motor such as the drive motor 220 shown in FIG. 2. However, it has been found that shifting from one displacement configuration to another results in a jolt during operation, an uncomfortable ride for an operator, and a negative perception of the power machine by operators.

The exemplary disclosed embodiments achieve a smooth speed transition of the two-speed hydraulic drive motor 220 while the machine is being operated, by automatically shifting between a low range and high range selection of the drive motor. Such a shift is imperceptible to the operator and provides speed and torque as needed. This is accomplished by controlling the drive motor 220, which is typically designed to operate at two specific displacements, in such a manner as to provide variable displacement of the drive motor 220 between the low range (i.e. maximum) displacement and the high range (i.e. minimum) displacement under certain circumstances. Typically, shifting between gears in the gearbox requires the power machine to be stopped and is typically accomplished in response to a specific user input. For the purposes of this discussion, any gearbox shifting routine can be employed. In addition, it should be understood that for the purposes of this discussion a two-speed gearbox is assumed. This assumption is made for illustrative purposes only and any speed gearbox can be employed (including a single speed gearbox) in various embodiments without departing from the scope of this discussion.

As discussed above, the shift actuator 224 is operably coupled to the drive motor 220 and is capable of engaging the drive motor 220 to shift the drive motor, that is, change the displacement of the drive motor. In FIG. 2, the shift actuator 224 is controlled by a power source 270, which controls the amount and direction of power provided to the shift actuator. Controller 250 provides a signal 272 to the power source 270, which indicates to the power source how much power and in what direction the power should be applied to the shift actuator. Providing power in a first direction will cause the actuator 224 to affect a displacement decrease in the drive motor 220. That is, the actuator 224 causes the drive motor to move away from the maximum displacement position and toward the minimum displacement position. Conversely, providing power in a second direction will cause the actuator 224 to affect a displacement increase in the drive motor 220. In some cases, power may only be applied in the first direction to overcome a bias in actuator 224, the bias tending to urge the actuator 224 toward the second direction.

Figure 3:
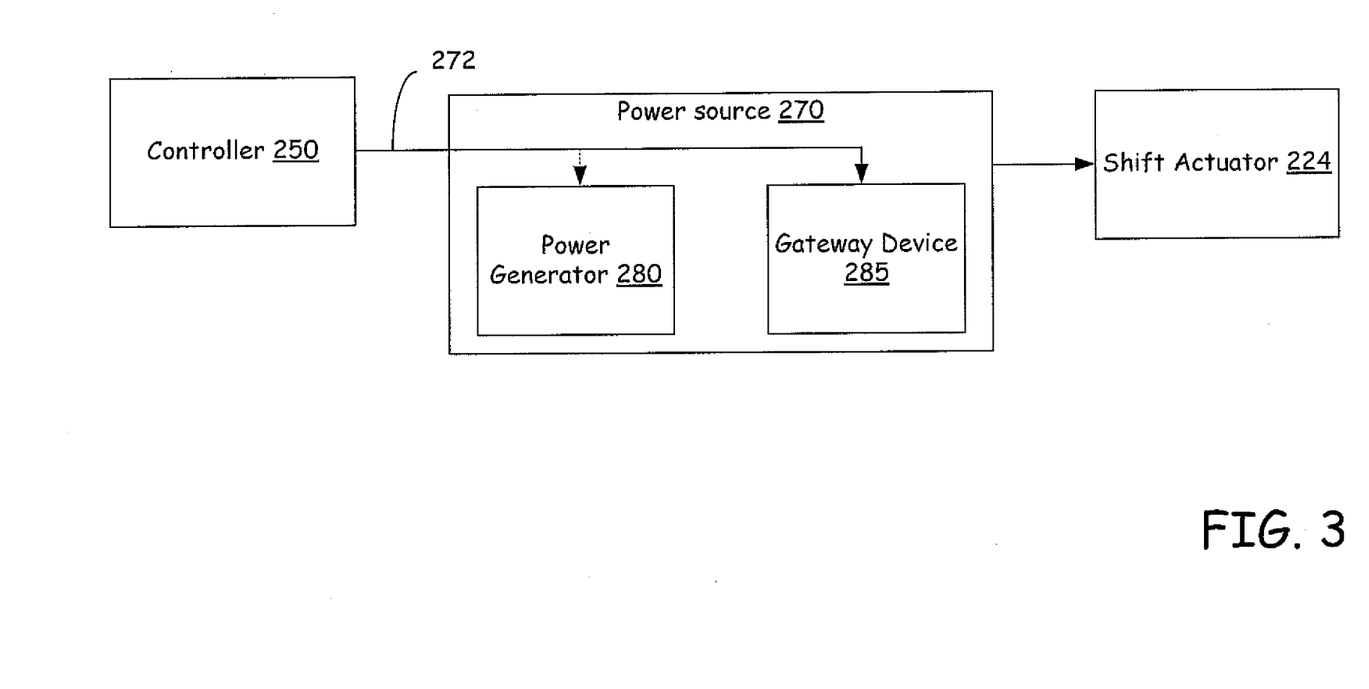
FIG. 3 is a block diagram illustrating a portion of the drive system of FIG. 2 in more detail.

FIG. 3 illustrates the relationship between the controller 250, power source 270, and shift actuator 224 in more detail. Controller 250 provides signal 272 to the power source 270, which includes a power generator 280 and a gateway device 285. The power generator 280 provides a source of power to the gateway device 285, which in turn is capable of providing power to the actuator 224. The signal 272 is provided to the gateway device 285 and in some embodiments can be provided to the power generator 280. As mentioned above, in some embodiments, the actuator 224 is a hydraulic cylinder that is coupled to the swash plate on the drive motor. In these embodiments, the gateway device 285 is a control valve that provides hydraulic fluid to the hydraulic cylinder and the power generator 280 is in the form of a hydraulic pump in communication with the gateway device 285. Power generator 280 can be a constant displacement pump or a variable displacement pump, in which case signal 272 may be provided to set the displacement of the pump. In other embodiments, the shift actuator can be, for example, an electrically-driven linear actuator, the gateway device 285 can be electrical switching device or driver and power generator 280 can be any electrical source on the machine.

Figure 4:
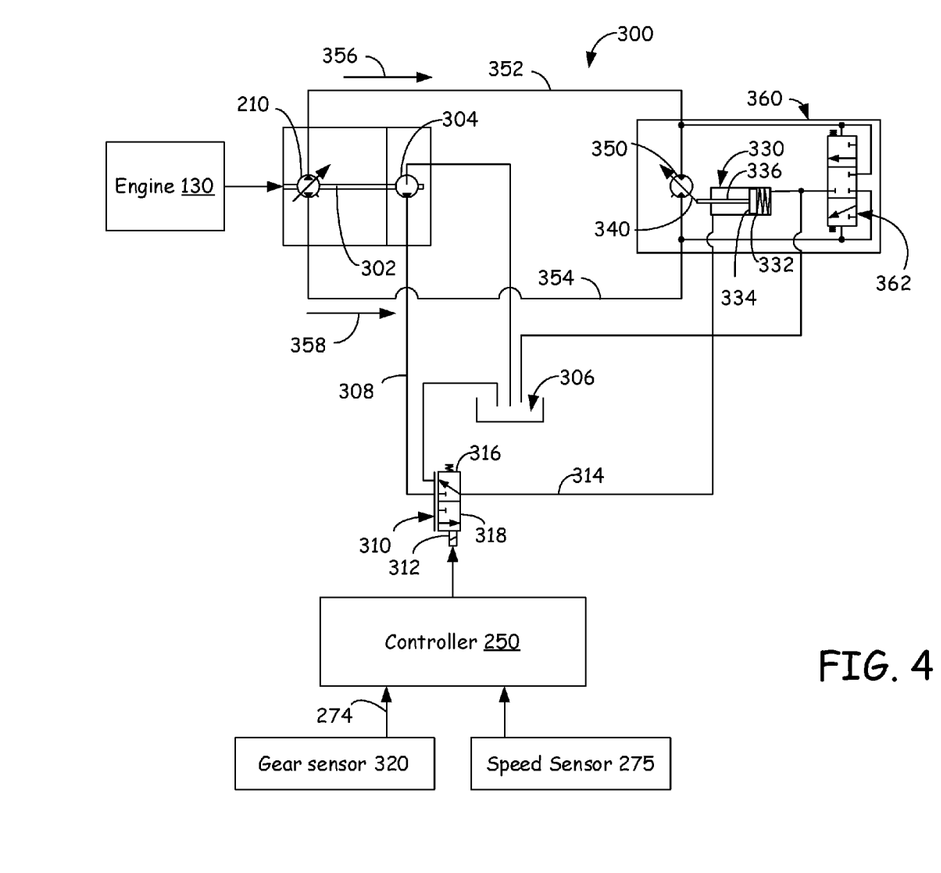
FIG. 4 is a hydraulic circuit diagram illustrating an exemplary embodiment of portions of the drive system of FIG. 2.

FIG. 4 is a simplified portion of a hydraulic schematic 300 of power machine 100 illustrating certain aspects of a drive system similar to drive system 200 according to one embodiment. It should be understood that the hydraulic circuit of a drive system for a power machine such as power machine 100 would include a number of additional components that are not shown in FIG. 4 because they are not relevant to the concepts set forth in this discussion. As illustrated, drive pump 210 is driven on a shaft 302 by engine 130. A constant displacement gear pump 304 is aligned in tandem with drive pump 210 on shaft 302. Gear pump 304 draws hydraulic fluid from a reservoir 306 and generates power in the form of pressurized fluid flow 308. The gear pump 304, then, serves as a power generator such as is shown as power generator 280 in FIG. 3.

The output 308 from the gear pump 304 is provided to a proportional control valve 310, which acts as a gateway device similar to gateway device 285 shown in FIG. 3. Collectively, then, the gear pump 304 and control valve 310 are a power source similar to power source 270 of FIG. 3. In the embodiment shown in FIG. 4, the control valve 310 is in communication via a hydraulic line 314 with a hydraulic cylinder 330, which acts as an actuator to control a swash plate 340 on drive motor 350. Control valve 310 is a three-way two-position valve. Control valve 310 is biased to a first position 316, in which hydraulic line 314 is provided a path to reservoir 306. In a second position 318, control valve 310 directs a portion of the fluid flow 308 to the hydraulic cylinder 330 so as to control the pressure provided to the hydraulic cylinder 330. As discussed above, control valve 310 is a proportional control valve, and therefore the pressure provided to the hydraulic cylinder 330 via hydraulic line 314 can be controlled by a solenoid 312, which receives a control signal from controller 250. Controller 250 illustratively provides a variable signal to solenoid 312 to control the proportional control valve 310. The variable signal level provided by the controller 250 can be a variable current, a variable voltage, a pulse-width modulated signal, or any other acceptable signal to actuate or indicate how the solenoid 312 should be actuated to control the position of the control valve 310. Because control valve 310 is a proportional control valve, the signal level provided to the solenoid 312 controls the position of the control valve between the two positions shown in FIG. 4 and therefore varies the pressure provided to the hydraulic cylinder 330 up to a maximum pressure. By controlling the pressure provided to the hydraulic cylinder 330, the position of hydraulic cylinder 330 and therefore the angle of swash plate 340 can be controlled, thereby allowing for control of the displacement of drive motor 350 between the minimum and maximum displacement, rather than just shifting from the minimum displacement to the maximum displacement and vice versa. It should be appreciated that the fluid flow 308 from the gear pump 304 can be provided to control other functions on the power machine 100 and that fluid not provided to the hydraulic line 314 is routed to other circuits not shown in FIG. 4 or to reservoir 306.

Controller 250 is shown in FIG. 4 as being in communication with a speed sensor 275, which measures the travel speed of the power machine. In addition, gear sensor 320 is in communication with controller 250 via signal lines 274 to provide an indication if the gearbox is engaged with a first gear reduction set or a second gear reduction set. In other words, the gear sensor 320 provides an indication to controller 250 as to which gear reduction set the power from the rotational output of the drive motor is provided. For the purposes of this discussion, the first gear reduction set is a low-speed, high torque reduction and the second gear reduction set is a high-speed, low torque reduction.

Drive motor assembly 360 includes drive motor 350, actuator 330, and flushing valve 362. Drive motor 350 is in communication with the drive pump 210 via hydraulic lines 352 and 354 to receive pressurized fluid from and return fluid to drive pump 210 in response to a user input. When pressurized fluid is provided from the pump in the direction shown by arrow 356, the fluid causes drive motor 350 to rotate in a direction to cause the power machine to travel in a forward direction. When pressurized fluid is provided from the pump in the direction shown by arrow 358, the fluid causes drive motor 350 to rotate in a direction to cause the power machine to travel in a reverse direction. Actuator 330 includes a cylinder body 332 having a moveable piston 334 located therein with a rod 336 coupled to the piston and extend from one end of the cylinder body and operably coupled to the swash plate 340 of motor 350. When the piston 334 is positioned such that rod 336 is fully extended out of the cylinder body, the swash plate 340 is moved to provide maximum displacement in drive motor 350. When the piston is positioned such that rod 336 is fully retracted, the swash plate 340 is moved to provide minimum displacement in drive motor 350. Hydraulic line 314 is in communication with the cylinder body 332 on a rod side of the piston 334. Flushing valve 362 has as its output provided to tank 306. Whenever drive motor 350 is actuated, a portion of the hydraulic fluid from a drive loop between the drive pump and drive motor 350 is provided to tank to allow for the introduction of replacement hydraulic fluid to the loop, effectively providing cooling of the hydraulic fluid. A biasing member such a spring biases actuator 330 to extend rod 336 in the absence of any pressure in line 314. In one embodiment, a base of the actuator 330 is in communication with tank 306 to relieve any leakage past the piston 334. The hydraulic circuit shown in FIG. 4 is but one embodiment that allows for manipulation of the displacement of an axial piston drive motor. Other arrangements can be employed without departing from the scope of this discussion.

By controlling the pressure supplied to hydraulic line 314, controller 250 is capable of controlling not only a shift of the drive motor 350 from a minimum displacement to a maximum displacement and vice versa, but controller 250 can control how fast that shift occurs, thereby eliminating the jarring effect of sudden drive motor shifts and in some cases, operating the drive motor at displacement levels between the minimum and maximum displacement levels, thereby advantageously operating the drive motor as an infinitely variable displacement drive motor, as opposed to only a two-speed drive motor.

Figure 5:
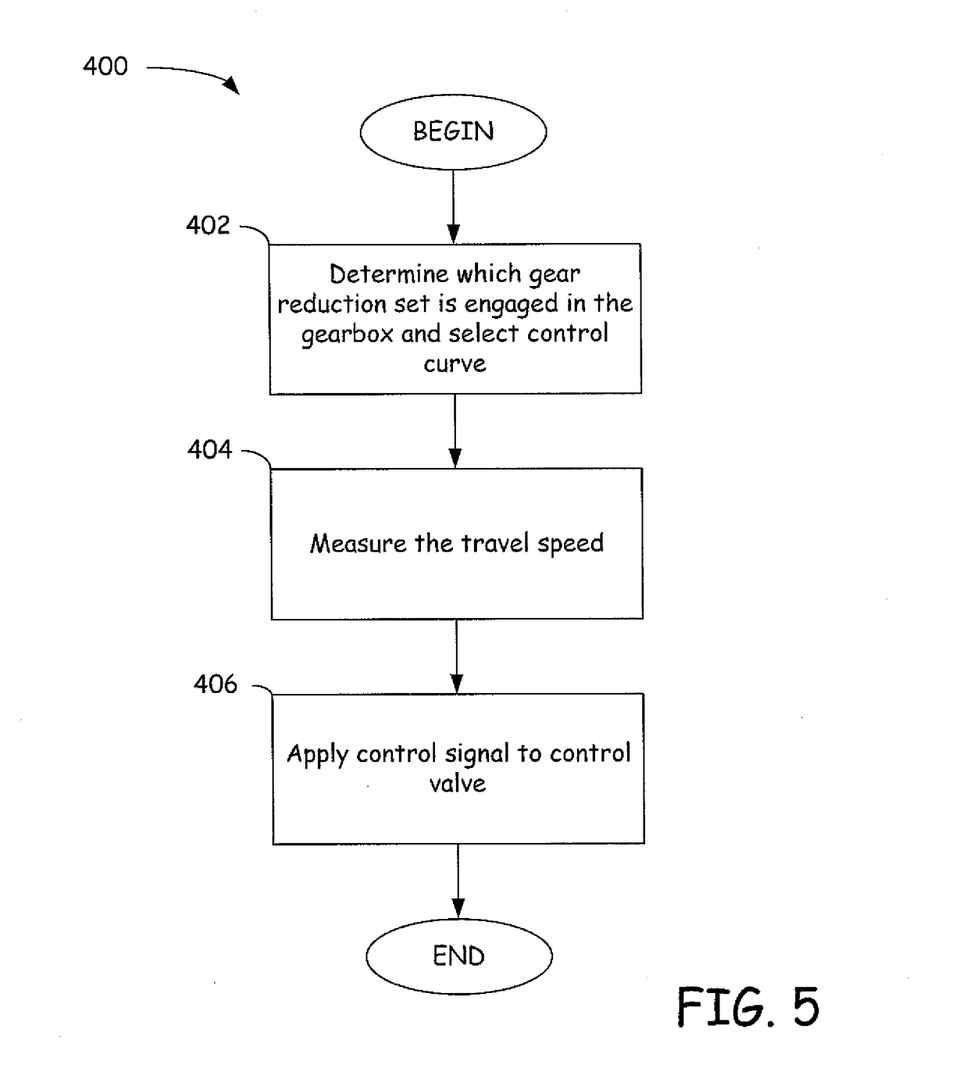
FIG. 5 is a flowchart detailing a method of shifting a hydraulic drive motor according to one illustrative embodiment.

FIG. 5 illustrates a method 400 of controlling the displacement of a drive motor similar to drive motor 350 according to one illustrative embodiment. The discussion of method 400 refers to the embodiments illustrated in FIG. 2-4. At block 402, the controller 250 determines which gear reduction set in the gearbox 230 is engaged. Once the controller 250 determines which gear reduction set is currently engaged, the controller selects a control curve for controlling the signal provided to the solenoid 312. At block 404, the controller 250 measures the travel speed of the power machine 100 by illustratively reading an indication from the speed sensor 275. At block 406, the controller 250 provides a signal to the solenoid according to the selected control curve.

In one embodiment, when the first gear reduction set is engaged a control curve is selected based on two travel speed set points. If the measured travel speed is below a first set point, no signal is provided to the solenoid. When the power machine is travelling above the first set point, but below the second set point, the controller 250 supplies a signal to solenoid 312 according to a selected control curve to provide an increasing signal to the solenoid 312 as the travel speed increases toward the second set point. As the signal provided to solenoid 312 increases, solenoid 312 shifts control valve 310 to apply increasing pressure to the rod end of cylinder 330. At the second set point, the signal supplied to the solenoid 312 reaches a maximum level and above that speed, a maximum signal level is applied to the solenoid 312. A maximum signal level is one that results in a fully shifted solenoid 312 away from a biased position. A similar type of curve may be applied to the solenoid when the gear sensor 320 indicates that the second gear reduction set is engaged, except at different set points.

When the gearbox 230 of power machine 100 has engaged the first gear reduction set, a maximum achievable travel speed is about 7.5 miles per hour (mph) when the drive motor is in low range and 15 mph when the drive motor is in high range. Of course, when the power machine is not moving, no signal is sent to the solenoid 312. Once the power machine reaches a travel speed of at least the first set point, the controller 250 starts sending a signal to the solenoid 312. In some embodiments, the first set point is set to a relatively low travel speed, which can be as low as can be reliably measured by a travel sensor, but can be set to any desirable speed. Controller 250 provides a signal to the solenoid 312 beginning at the first set point and increases for a given amount from the first set point as the travel speed increases. When the signal is applied to solenoid 312, it causes control valve 310 to begin and increase movement to allow increasingly more pressurized fluid into hydraulic line 314. At some speed above the first set point, in one embodiment about 3 mph, the control valve 310 allows enough pressurized fluid to enter hydraulic line 314 and act against piston 334 to cause piston 334 to move against a biasing member. From that point until the second set point, the pressure acting against piston 334 increases, causing the piston 334 to move and further decrease the displacement of the drive motor, providing a higher speed, lower torque drive motor. Eventually, the signal increases to the maximum signal at the second set point, which in one embodiment is at a travel speed of about 12 mph when the gearbox 230 is in the first gear reduction set, at which time the drive motor is fully shifted to high range. In other embodiments, the second set point can be set to any other travel speed that provides an advantageous speed at which to reach minimum displacement. With controller 250 configured to allow the drive motor 350 to operate as a variable displacement motor in this transition phase, the shift is implemented smoothly and is not noticeable to the operator. Controller 250 is also configured to ensure that the drive motor 350 is at maximum displacement at low speed to ensure maximum tractive effort, and to ensure that the drive motor 350 is fully shifted at high travel speeds to ensure that top travel speed requirements are met.

Figure 6:
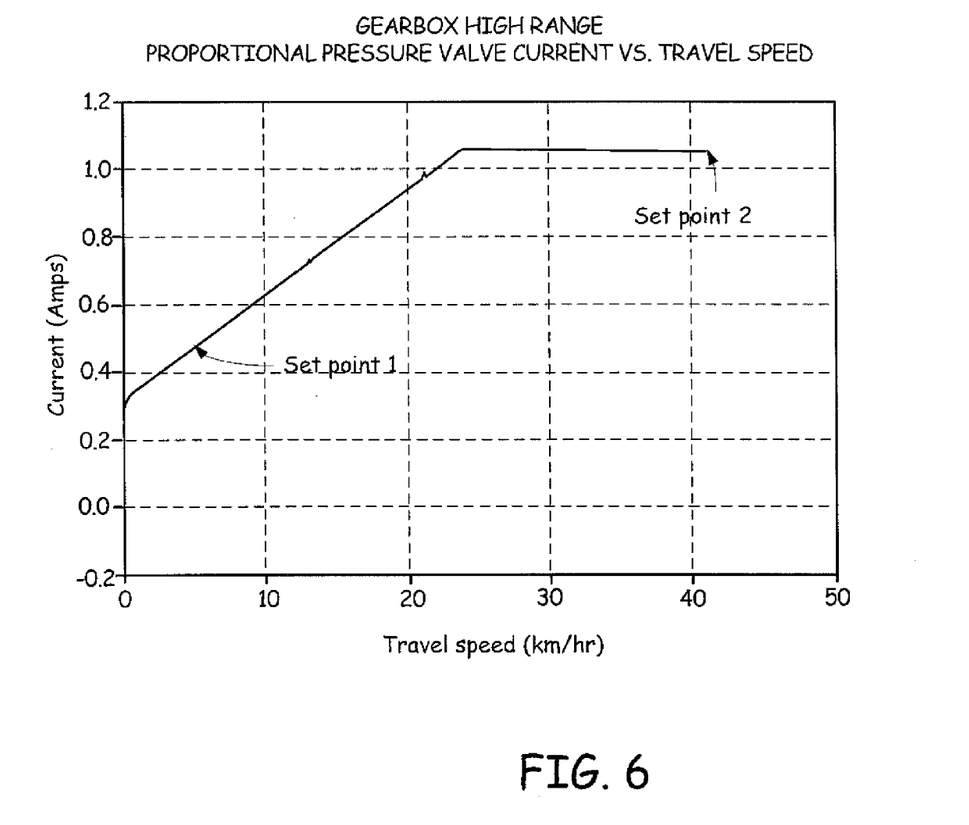
FIG. 6 is a plot illustrating a relationship between a solenoid drive current of a continuously variable output valve and travel speed of a power machine in one example embodiment.

Referring now to FIG. 6, shown is a plot of current provided to the solenoid 312 vs. travel speed when the second gear reduction the gearbox 230 is engaged. In one embodiment, a maximum travel speed when the second gear reduction is engaged is about 15 mph in the low range of the drive motor 350 and about 30 mph in the high range. The first set point is similar to the first set point when the gearbox is engaged with the first gear reduction set, that is as low as can be reliably measured by a travel sensor and the second set point is at about 24 km/hr. (approximately 15 mph). At speeds above 24 km/hr, any increase or decrease in machine travel speed will be generated only by increased or decreased flow from the pump 210 to the drive motor 350. However, in the travel speed band for most of the band between the first set point and the second set point, travel speed is controlled by a combination of the flow from the pump 210 to the drive motor 350 and the displacement change of drive motor 350. Below the first set point, the speed is again varied strictly by how much fluid is being provided from the pump to the drive motor. While the plot of FIG. 6 illustrates a linear relationship between solenoid drive current and machine speed that need not be the case. Any relationship between solenoid drive current and travel speed that provides satisfactory drive motor displacement control can be employed. In addition, the current vs. speed relationship can be different for different gearbox modes or positions. Further, the set point speeds, or at least the second set point speed, will typically be different when the gearbox is in the high range as compared to when the gearbox is in the low range.

In one example embodiment, the drive motor starts to shift from maximum displacement to minimum displacement when the pressure provided in hydraulic line 314 reaches approximately 90 psi and is fully shifted at approximately 210 psi. A conventional drive circuit without the disclosed features might typically experience a pressure jump from 0 psi to 210 psi, shifting the drive motor immediately from one displacement to another. This causes a distinctive "jerk" in the drive system. With a drive system using the above disclosed concepts, the drive motor is shifted gradually as pressure ramps up from the start shift pressure to the end shift pressure. For example, when the applied shift pressure is between approximately 90 psi and approximately 210 psi, the drive motor 350 operates in a displacement somewhere between maximum and minimum. The actual motor displacement will vary with both motor speed and drive loop pressures. However, to achieve benefits of disclosed embodiments, in this circuit, it is not critical to operate at a specific displacement in between the maximum and minimum. Rather, the need is to have a smooth shift that is imperceptible to the operator. Utilizing the software or firmware configuration of controller 250 to allow the two-speed drive motor 350 to operate as a variable displacement drive motor in this transition phase allows the shift to be smooth and not noticeable to the operator. Controller 250 is configured to ensure the motor is at maximum displacement at low speed to ensure maximum tractive effort. It is also configured to ensure that the motor is fully shifted to a minimum displacement at high travel speed to ensure that the vehicle can reach top travel speed.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the disclosed drive system with two-speed drive motor control. Also, in other embodiments, other techniques for controlling the two-speed drive motor can be utilized. Other examples of modifications of the disclosed concepts are also possible, without departing from the scope of the disclosed concepts. In other embodiments, drive motor 350 can be a multi-speed drive motor having more than two displacement modes of operation.

What is claimed is:

1. A power machine having an engine and a drive system configured to effect travel of the power machine, the drive system comprising:

a drive pump driven by the engine, the drive pump configured to provide a hydraulic power output in response to a drive signal;

a drive motor having a rotational output member, wherein the drive motor is configured to selectively operate in a low range mode having high-displacement and in a high range mode having low-displacement, the drive motor being operably coupled to and receiving the hydraulic power output from the drive pump and having an operating displacement that is variable between a minimum displacement in the high range mode and a maximum displacement in the low range mode;

a gearbox that selectively operably couples the rotational output member of the drive motor to one of a plurality of gear reduction sets;

a shift actuator operably coupled to the drive motor and configured, in response to a variable electric signal, to vary the displacement of the drive motor between the minimum displacement and the maximum displacement;

a controller operably coupled to the shift actuator;

a gear sensor in communication with the controller and configured to provide to the controller an indication of which of the plurality of gear reduction sets is selected;

wherein the controller is configured to select a control curve for controlling the shift actuator based upon which of the plurality of gear reduction sets is selected, the controller further configured to provide the variable electric signal based upon the selected control curve to control the shift actuator to cause the drive motor to provide infinitely variable displacement between the minimum and maximum displacements; and a power source operably coupling the controller to the shift actuator, the power source being configured to receive the variable electric signal from the controller and to responsively control an amount and direction of power provided to the shift actuator in order to control the drive motor to provide the variable displacement.

2. The drive system of claim 1, wherein the power source includes a power generator configured to provide a source of power and a gateway device configured to receive the source of power, the gateway device receiving the variable electric signal from the controller and responsively providing power from the power source to the shift actuator.

3. The drive system of claim 2, wherein the power generator includes a hydraulic pump and the gateway device comprises a proportional control valve, the proportional control valve having a solenoid operably coupled to the controller to receive the variable electric signal from the controller and responsively controlling a position of the proportional control valve to vary a pressure from the hydraulic pump provided to the shift actuator.

4. The drive system of claim 1 and further comprising:

a speed sensor in communication with the controller and configured to provide an indication of a travel speed of the power machine; and wherein the controller is configured to provide the variable electric signal to control the shift actuator based upon the travel speed of the power machine.

5. The drive system of claim 4, wherein when the travel speed is below a first set point, the controller is configured to provide the variable electric signal indicative of an intention to cause the drive motor to operate at maximum displacement.

6. The drive system of claim 5, wherein when the travel speed is above a first set point and below a second set point, the controller is configured to provide the variable electric signal indicative of an intention to vary the drive motor between the maximum displacement and the minimum displacement based on the travel speed.

7. The drive system of claim 6, wherein when the travel speed is above a second set point, the controller is configured to provide the variable electric signal indicative of an intention to cause the drive motor to operate at minimum displacement.

8. The drive system of claim 1, wherein the plurality of gear reduction sets includes a first gear reduction set and a second gear reduction set, and wherein the controller selects a first control curve for controlling the shift actuator when the first gear reduction set is selected and the controller selects a second control curve for controlling the shift actuator when the second gear reduction set is selected.

9. The drive system of claim 1, wherein the drive motor includes a swash plate movable to vary the displacement of the drive motor, and wherein the shift actuator includes a hydraulic cylinder operably coupled to the swash plate to move the swash plate.

10. A power machine having an engine, a drive pump driven by the engine to provide a hydraulic power output, a drive motor configured to receive the hydraulic power output from the drive pump and in response to rotate a rotational output member, wherein the drive motor is configured to selectively operate in a low range mode having high-displacement and in a high range mode having low-displacement, wherein the power machine further comprises:
   a travel speed sensor for providing a signal indicative of the travel speed of the power machine;
   a shift actuator operably coupled to the drive motor and configured to control the displacement of the drive motor;
   a gearbox that selectively operably couples the rotational output member of the drive motor to a selected one of a plurality of gear reduction sets;
   a gear sensor configured to provide an indication of which of the plurality of gear reduction sets is selected; and
   a controller in communication with the shift actuator, the travel speed sensor, and the gear sensor, and configured to control the shift actuator to cause the drive motor to provide infinitely variable displacement between the high-displacement of the low range mode and the low-displacement of the high range mode, wherein the controller is configured to select a control curve for controlling the shift actuator based upon which of the plurality of gear reduction sets is selected, and wherein the controller controls the shift actuator to vary the displacement of the drive motor being as a function of the travel speed of the machine.

11. A method of selecting a displacement of a drive motor between a minimum motor displacement and a maximum motor displacement in a power machine, the drive motor having a rotational output provided to a gearbox having a plurality of gear reduction sets configured to be engaged with the rotational output, the method comprising:
   measuring a travel speed of the power machine;
   determining, using a gear sensor, which of the plurality of gear reduction sets is engaged with the rotational output;
   selecting a control curve from a plurality of control curves based upon the determination of which of the plurality of gear reduction sets is engaged with the rotational output; and
   providing a control signal from a controller as a function of the selected control curve and of the measured travel speed to select a drive motor displacement between the maximum displacement and the minimum displacement, and varying the control signal to provide infinitely variable drive motor displacement as the power machine speed increases from a first set point speed to a second set point speed.

* * * * *